United States Patent Office 3,647,783
Patented Mar. 7, 1972

3,647,783
(2-SUBSTITUTED - 5 - OXO-CYCLOPENT-1-ENYL) ESTERS OF α-CARBOXYARYLMETHYL PENICILLINS
Donald K. Pirie, Uncasville, Conn., assignor to Chas. Pfizer & Co., Inc., New York, N.Y.
No Drawing. Filed Aug. 4, 1969, Ser. No. 847,432
Int. Cl. C07d 99/16
U.S. Cl. 260—239.1
8 Claims

ABSTRACT OF THE DISCLOSURE

A series of α-{carbo-[1-(2-substituted-5-oxo-cyclopent-1-enyloxy]}arylmethyl penicillins wherein the substituent is lower alkyl or benzyl and methods for their preparation are described.

BACKGROUND OF THE INVENTION

This invention relates to a novel series of antibiotic agents and to methods for their preparation. More particularly, it relates to a series of substituted cyclopentenyl esters of α-carboxyarylmethylpenicillins which are active against a wide variety of bacteria, including gram-positive and gram-negative organisms, both in vitro and in vivo.

The availability of orally effective forms or derivatives of penicillin antibiotics, and especially of α-carboxybenzylpenicillin, one of the few penicillins effective against gram-positive and gram-negative organisms, is limited. The development of derivatives or forms of α-carboxybenzylpenicillin and of related compounds which are effective per se or which are metabolized to the parent acid represents a substantial advancement in the treatment of infections in vivo.

SUMMARY OF THE INVENTION

There has now been found a novel series of esters of α-carboxyarylmethylpenicillins of the formula

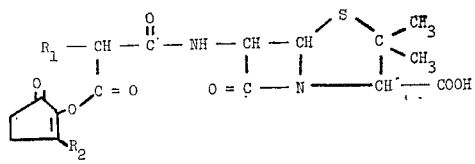

R₁ is selected from the group consisting of thienyl, furyl, pyridyl, phenyl, and substituted phenyl wherein the substituent is selected from the group consisting of (lower)alkyl, chloro, bromo, (lower)alkoxy, di(lower) alkylamino, and trifluoromethyl; and
R₂ is selected from the group consisting of lower alkyl and benzyl.

Of the lower alkoxy and lower alkyl groups those having from 1 to 4 carbon atoms in the alkyl and alkoxy moieties are preferred since the reactants bearing such groups are more readily available than are those required for such groups showing a greater number of carbon atoms.

Also included within the scope of this invention are the pharmaceutically-acceptable salts of the novel compounds of Formula I in which one or both acid groups are involved in salt formation. Salts such as the sodium, potassium, calcium, magnesium, ammonium and substituted ammonium salts, e.g., procaine, dibenzylamine, N,N'-dibenzylethylenediamine, N,N'-bis - (dehydroabietyl)ethylenediamine, 1-ephenamine, N-ethylpiperidine, N-benzyl-β-phenethylamine, trialkylamines, including triethylamine, as well as salts with other amines which have been used to form salts with benzylpenicillin are useful for the preparation of pharmaceutically-elegant compositions of these valuable antibiotics.

These novel compounds can exist in epimeric "D" and "L" forms, conveniently referred to as the D- and L-epimers. Therefore, included within the purview of this invention are the D- and L-epimers and mixtures thereof of the compounds of Formula I above, each of which exhibits substantial therapeutic activity.

The novel compounds of this invention are conveniently prepared by the acylation of 6-aminopenicillanic acid or an alkali metal, e.g., sodium or potassium, salt thereof or a tri(lower alkyl)amine salt thereof, such as the triethylamine salt with an arylmalonic acid ester of the formula

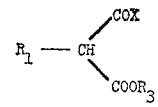

wherein X is selected from the group consisting of chloro, bromo, and —OCOR₄ wherein R₄ is selected from the group consisting of benzyl and lower alkyl; R₃ is

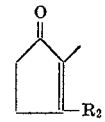

and R₁ and R₂ are as defined above, in a reaction-inert solvent at a temperature of from about 0° to 50° C. and a pH of from about 5 to about 8.

The degree of purity of the 6-aminopenicillanic acid is not critical to the success of the process. The 6-aminopenicillanic acid can be used in the pure form, the partially pure form, or in crude form such as that contained in a fermentation broth. Indeed, when using water as solvent, fermentation broths containing 6-aminopenicillanic acid are favored from an economic standpoint.

By reaction-inert solvent is meant a solvent which, under the conditions of the process, does not enter into any appreciable reaction with either the reactants or the products. Aqueous and non-aqueous solvents can be used. The use of water as solvent does, of course, result in some hydrolysis of the acid chloride reactant. However, under the proper conditions of temperature, pH and time, the hydrolysis occurs at a relatively slow rate compared to the desired N-acylation reaction. Suitable solvents for the process of this invention include methylene chlorine, benzene, chloroform, dioxane, water, acetone, tetrahydrofuran, diethyl ether and dimethyl ether. Aqueous solvent systems, including those in which an emulsion is formed, e.g., water-water immiscible solvent, can also be used. Solvents which readily form emulsions with water include those water immisicible solvents such as benzene, n-butanol, methylene chloride, chloroform, methyl isobutyl ketone, and lower alkyl acetates (e.g., ethyl acetate). The favored water immiscible solvents are methyl isobutyl ketone and ethyl acetate.

The reaction is conducted over the pH range of from about 5 to about 8 and, preferably, over the pH range of 6 to 7. The pH is maintained at about the neutral point by the addition of a suitable acid acceptor such as an alkali metal or alkaline earth metal hydroxide. Alternatively, and preferably, the pH is maintained by the expedient of employing a salt of 6-amino-penicillanic acid with an organic base. Any organic base which forms a salt with 6-aminopenicillanic acid can be used. Suitable organic bases are tri(lower)alkylamines, dibenzylamine, N,N' - dibenzylethylenediamine, N - (lower)alkyl piperidines, N-(lower)alkyl morpholines, N-benzyl-β-phenylethylamine, N,N'-bis-dehydroabiethylamine, dehydroabietylamine and 1-ephenamine. It is advantageous, however, to use a tri(lower alkyl)amine, preferably triethylamine, as the organic base. Such bases have the advantage of forming a salt with 6-aminopenicillanic acid which is solublue in many of the above-named solvents. They are particularly useful when using a non-aqueous solvent system such as methylene chloride.

The reaction can be conducted over a wide range of temperature. Temperatures of from about 0° C. to about 50° C. are operative. It is, however, preferred to employ temperatures ranging from about 0° C. to about 30° C. in order to prevent degradation of the products.

The preferred form of the arylamalonic acid esters as acylating agents is the monoacid chloride because of the relative ease of preparation compared to preparation of the anhydrides.

The arylmalonic acid monoester reactants are conveniently prepared by reaction of the appropriate aryl chloro carbonyl ketene

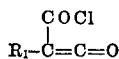

with the proper alcohol $R_3OH$, wherein $R_1$ and $R_3$ are as defined above to produce an arylcarboxy carbonyl ketene. The reaction is conducted on a 1:1 molar ratio at a temperature of from about −70° C. to about 30° C. and, desirably, in a reaction-inert solvent to permit better mixing and control of the reaction. Suitable solvents are diethyl ether, dimethyl ether, dioxane, methylene chloride and chloroform.

The reaction mixture is then treated with water and a base, e.g., sodium bicarbonate, added. The reaction mixture, if below the freezing point of water, is warmed to at least 0° C. either before or after addition of the water and base. Sufficient base, generally two to three equivalents, is added in order to neutralize the by-product hydrogen chloride, and to form the salt of the arylmalonic acid monoester. The mixture is stirred for about one-half hour then the organic solvent removed under reduced pressure below 35° C. The remaining solution is extracted with ether, cooled to 10°–15° C. and adjusted to about pH 2. The acid solution is extracted with a suitable solvent, e.g., methylene chloride, the extract dried and the solvent then removed under reduced pressure.

Alternatively, the arylmalonic acid monoesters are prepared by monoesterification of the chosen arylmalonic acid according to known procedures, for example, by reacting the arylmalonic acid with the alcohol reactant in the presence of thionyl chloride and N,N-dimethylformamide.

The arylmalonic acid monoesters thus produced are converted to their mono acid chloride derivatives by treatment with excess thionyl chloride, usually in the presence of a reaction-inert solvent such as benzene, diethyl ether, or methylene chloride at a temperature of from about 0° to about 80° C., according to procedures well known to those skilled in the art.

The required arylchlorocarbonyl ketenes are prepared by the reaction of an arylmalonic acid with a halogenating agent selected from the group consisting of $PCl_5$, $PCl_3$, $POCl_3$ and $SOCl_2$ at temperatures ranging from about 0° to about 50° C. for periods ranging from about one hour to about ten hours. The reaction is conducted in the presence of a solvent system, preferably a reaction-inert solvent system. Suitable solvents are dialkyl ethers; e.g., diethyl ether, dipropyl ether, mono- and dimethyl ethers of ethylene glycol and propylene glycol, methylene chloride and chloroform.

The reaction period is, of course, dependent upon the reaction temperature and the nature of the reactants. However, for a given combination of reactants, the lower temperatures require longer reaction periods than do higher temperatures.

The molar proportions of reactants, i.e., arylmalonic acid and halogenating agent, can vary widely; e.g., up to 1:10 or higher but, for satisfactory yields, should be at least stoichiometric. In actual practice, the stoichiometric ratio of reactants is preferred.

The reactants may be added all at once or separately.

If separately, the order of addition is not critical. However, it appears that the reaction is smoother and subject to fewer side reactions, as evidenced by the color or the reaction mixture, particularly upon distillation, when the arylmalonic acid is added to the halogenating agent. The reaction mixture, under such conditions, generally progresses from a yellow to a red color. The reaction mixture on reverse addition; i.e., the addition of halogenating agent to the arylmalonic acid, progresses from yellow to black.

The arylhalocarbonyl ketene products are isolated from the reaction by distillation in vacuo. Because of their great reactivity, they are generally stored under a nitrogen atmosphere at low temperatures and in the absence of light.

Acid anhydride derivatives of the arylmalonic acid half esters are prepared by reaction of the half esters with a chloro(loweralkyl)carbonate in the presence of an acid acceptor such as pyridine or a tri(lower alkyl)amine. Such reactions are described in the J. Am. Chem. Soc. 75, 637–9 (1953) and J. Org. Chem. 22, 248 (1957). As will be obvious to those skilled in the art, other chlorocarbonates, such as chlorobenzylcarbonate and chlorophenyl carbonate, can be used in place of the chloro(lower alkyl)carbonates.

Alternatively, the novel compounds described herein are prepared by the acylation of 6-aminopenicillanic acid with an arylcarboxy ketone of the formula

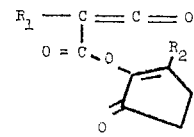

wherein $R_1$ and $R_2$ are as defined above.

The acylation of 6-aminopenicillanic acid with such agents is conducted at a temperature of from about −70° C. to about 50° C. and preferably at a temperature of from about 0° C. to about 30° C. The reaction period is generally from a few minutes up to about 5 hours. A recation-inert solvent such as ethyl acetate, dioxane, tetrahydrofuran, methyl isobutyl ketone, chloroform or methylene chloride is generally used to facilitate stirring and temperature control. It has been found especially convenient to first form the arylcarboxy ketene ester as described above and to use the reaction mixture, without isolation of the arylcarboxy ketene ester, directly in the amine acylation reaction. In such instances, an organic base, i.e., a tertiary amine such as triethylamine or other trialkylamine, preferably a tri(lower alkyl)amine, is used to remove the hydrogen halide produced in formation of the arylcarboxy ketene ester. From a practical standpoint, teh 6-aminopenicillanic acid is used as its triethylamine salt. For this reason, methylene chloride is a preferred solvent since the triethylamine salt is readily soluble therein. The sodium or potassium salts of 6-aminopenicillanic acid can also be used, but the preferred salt is the triethylamine salt because of its greater solubility in the solvent systems used. An excess of the amine to be acylated can, of course, be used as acid acceptor but is generally avoided, not only for economic reasons but also to prevent possible ammonolysis of the ester group. The reaction is desirably conducted under an atmosphere of nitrogen.

The 2-hydroxy-3-lower alkyl-cyclopent - 2 - en - 1 - ones and the 2-hydroxy - 3 - benzylcyclopent - 2 -en - 1- one reactants are prepared by adding a dialkyl adipate, e.g., dimethyl or diethyl adiphate, to a slight excess of a base, such as sodium methoxide, slurried in a reaction-inert solvent, e.g., benzene, toluene, etc., preferably, N,N-dimethylformamide to produce a sodium-2-carbalkoxy-cyclopentan-1-one. The reaction mixture in this cyclization step is heated under reduced pressure from about 80–140° C., the exact temperature depending upon the solvent used. The alkanol formed in the cyclization of the adipate ester, e.g., methanol, and some of the reaction solvent are distilled from the reaction mixture thereby enhancing the yield of the alkali metal 2-carbalkoxycyclopentan-1-one. The resulting clear brown solution is cooled whereupon the alkali metal salt precipitates and may be isolated if desired. Usually, however, it is convenient to use the slurry of the salt directly in the next process step.

The alkali metal-2-carbalkoxycyclopentan-1-one is then alkylated with excess lower alkyl halide to give 2-lower alkyl - 2 - carbalkoxycyclopentan-1-one. Preferred conditions involve the use of at least 1.1 moles of lower alkyl halide per mole of the alkali metal salt of 2-carbomethoxycyclopentan-1-one at temperatures ranging from about 25° C. to about 100° C., depending upon the lower halide reactant. The alkylation reaction is generally carried out in a dipolar aprotic solvent such as dimethylformamide. The preferred alkylating agents are the alkyl and benzyl halides although the corresponding tosylates and sulfates can be used as well. Of the alkyl and benzyl halides the iodides and bromides are generally preferred since as a class the chlorides do not give the best yields. Following alkylation, residual solvent may be removed by distillation under reduced pressure and the product may be further purified a described in the examples appearing hereinafter.

Chlorine or sulfuryl chloride is then introduced into a reaction-inert organic solvent solution of the aforesaid 2-lower alkyl (or 2-benzyl) substituted compound at a temperature of from about 45° C. to about 60° C. to obtain the corresponding 2-substituted-2-carbomethoxy-5,5-dichlorocyclopentan-1-one. The reaction is generally exothermic and requires external cooling. Suitable solvents include glacial acetic acid, chloroform, carbon tetrachloride and dichloroethylene, with glacial acetic acid being preferred. The resulting 5,5-dichloro substituted compound may be recovered by distillation of the inert organic solvent followed by fractional distillation of the residue.

The dichloro products are then hydrolyzed to the corresponding hydroxy compounds. Typical hydrolysis procedures comprise any combination of water, mineral acid and solvent which when added to the hydrolysis mixture will cause the 5,5-dichloro compound to go into solution, e.g., acetic acid, formic acid and lower alkanols.

The α-carboxyarylmethylpenicillin esters are isolated by conventional methods known to those skilled in the art. A typical method, for example, when using water as solvent, comprises adjusting the pH of the reaction mixture to about 2-3 and extracting the product with ethyl acetate. The ethyl acetate extract is washed with water, the product extracted therefrom with 10 percent aqueous potassium bicarbonate, then back-extracted into ethyl acetate. The ethyl acetate extracts are once again extracted with water, the aqueous extract brought to pH of 2-3, then re-extracted with ethyl acetate. The product is recovered by removal of the volatiles. Alternatively, the product is isolated as an alkali metal or amine salt by addition of the proper base, inorganic or organic, to the dry ethyl acetate extract.

When using an aqueous emulsion as solvent, it is expedient to isolate the product by extracting the reaction, after adjustment to pH 2, with a suitable water-immiscible solvent. Ethyl acetate is especially useful. The extract is then dried and evaporated to dryness. The product is converted to an amine or alkali metal salt by adding the appropriate base; e.g., N-ethyl piperidine or potassium ethyl hexanoate to a solution of the ester product in a suitable solvent such as ethyl acetate.

A further method which is of value when the acrylation reaction is conducted in a non-aqueous solvent medium, e.g., in methylene chloride, comprises adding water to the reaction mixture and then adjusting the pH of the aqueous phase to about 2–3. The aqueous phase is separated, extracted with the non-aqueous solvent, and the combined non-aqueous solvent layers dried. The products are precipitated from the non-aqueous solvent by the addition of a suitable organic base such as N-ethylpiperidine or by the addition of sodium or potassium 2-ethyl hexanoate as their corresponding salts. Alternatively, the non-aqueous solvent, after drying, is removed by distillation at a lower temperature, the residue taken up in a suitable solvent, and the product precipitated therefrom by addition of an appropriate base. This alternative procedure affords greater latitude as regards choice of the base. The appropriate solvent is determined by the solubility of the desired salt.

A still further method comprises evaporating the reaction mixture to dryness under reduced pressure, dissolving the residue in citrate buffer (pH 5.5) and extracting the product therefrom with chloroform. The chloroform extracts are washed with citrate buffer (pH 5.5), dried with anhydrous sodium sulfate and evaporated to dryness. In another method, which is of value for the isolation of acylation products poorly soluble in methylene chloride or chloroform, the above method is followed but using n-butanol as extracting solvent in place of chloroform. The product remaining after removal of the n-butanol solvent by evaporation is tirturated with ether to produce an amorphous solid.

The esters are converted by known methods to the corresponding acids as, for example, by mild acid or mild alkaline hydrolysis or enzymatically with an esterase such as liver homogenate.

The valuable products of this invention are remarkably effective in treating a number of susceptible gram-positive and gram-negative infections in animals, including man. For this purpose, the pure materials or mixtures thereof with other antibiotics can be employed. They may be administered alone or in combination with a pharmaceutical carrier selected on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixers or oral suspensions which may contain flavoring or coloring agents, or be injected parenterally, that is, for example, intramuscularly or subcutaneously. For parenteral administration, they are best used in the form of a sterile aqueous solution which may be either aqueous such as water, isotonic saline, isotonic dextrose, Ringer's solution or non-aqueous such as fatty oils of vegetable origin (cotton seed, peanut oil, corn, sesame) and other non-aqueous vehicles which will not interfere with the therapeutic efficiency of the preparation and are nontoxic in the volume or proportion used (glycerol, propylene glycol, sorbitol). Additionally, compositions suitable for extemporaneous preparation of solutions prior to administration may advantageously be made.

Such compositions may include liquid diluents, for example, propylene glycol, diethyl carbonate, glycerol, sorbitol, etc.; buffering agents, as well as local anesthetics and inorganic salts to afford desirable pharmacological properties.

The oral and parenteral dosage levels for the herein described compounds are, in general, on the order of up to 200 mg./kg. and 100 mg./kg. of body weight per day, respectively.

Many of the penicillin ester compounds of this invention exhibit improved absorption or oral administration over that produced by the corresponding free acid or alkali metal salt forms. They, therefore, represent convenient and effective dosage forms of the α-carboxyarylmethylpenicillins.

The antimicrobial spectra of several α-carboxybenzyl penicillin esters of this invention are presented below (Table I). The tests were run under standardized conditions in which nutrient broth containing various concentrations of the test material was seeded with the particular organism specified, and the minimum growth (MIC) at which growth of each organism failed to occur was observed and recorded. The test materials have the following formula and were tested as their N-ethyl piperidinium salts.

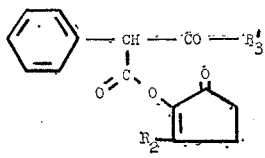

wherein $R_3'$ represents the 6-aminopenicillanic acid moiety.

TABLE I.—Antimicrobial Spectra (MIC values)

| Microorganism | $R_2$ | | | | | |
|---|---|---|---|---|---|---|
| | Methyl | Ethyl | n-Propyl | n-Butyl | Sec-butyl | Benzyl |
| Proteus mirabilis A-1 | 6.25 | 0.391 | 0.781 | 0.391 | 3.12 | 0.781 |
| Escherichia coli 266 | 6.25 | 1.56 | 1.56 | 1.56 | 3.12 | 3.12 |
| Pasteurella multocida | 0.098 | 0.012 | 0.012 | 0.024 | 0.391 | 0.024 |
| Pseudomonas 10490 | 1.56 | 0.391 | 0.391 | 0.391 | 1.56 | 0.195 |
| Streptococcus pyogenes C 203 | 0.098 | 0.195 | 0.195 | 0.195 | 0.012 | 0.024 |
| Staphylococcus aureus 5 | 0.024 | 0.391 | 0.391 | 0.391 | 1.56 | 0.391 |
| Staphylococcus aureus 400 | 200 | 50 | 50 | 50 | 100 | 12.5 |

Table II presents in vivo data for several compounds of this invention in mice (PO=oral and SQ=subcutaneous routes of administration). The values are obtained under standardized conditions. The procedure comprises production of an acute experimental E. coli 266 infection in mice by the intraperitoneal inoculation of the mice with a standardized ($10^{-6}$) E. coli 266 culture suspended in 5 percent hog gastric mucin. The test compounds, in the form of their N-ethylpiperidinum salts, are administered to the infected mice by a multiple dosing regimen in which the first dose is given 0.5 hour after inoculation and is repeated 4, 24 and 48 hours later. The percent of mice surviving are then determined.

The $LD_{100}$ of E. coli 266 (the lowest concentration required to produce 100 percent mortality in mice) is $10^{-7}$. Control animals receive inocula of $10^{-5}$, $10^{-6}$ and $10^{-7}$ as a check on possible variation in virulence which can occur.

TABLE II.—In vivo Data vs. E. coli 266 in Mice

| $R^2$ | Percent survivors | | | |
|---|---|---|---|---|
| | P.O. | | S.Q. | |
| | 200 (mg./kg.) | 50 (mg./kg.) | 200 (mg./kg.) | 50 (mg./kg.) |
| Methyl | 80 | *10 | 90 | 60 |
| Ethyl | 90 | 10 | 100 | 80 |
| n-Propyl | 90 | 0 | 100 | 100 |
| n-Butyl | 100 | 20 | 100 | 100 |
| Sec.-butyl | 100 | 10 | 80 | 70 |
| Benzyl | 90 | 10 | 100 | 80 |

*100 mg./kg.

The following examples are provided to illustrate in greater detail the manner of practicing the present invention.

EXAMPLE I

α-{carbo-[1-(2-methyl-5-oxo-cyclopent-1-enyloxy)]} benzylpenicillin N-ethylpiperidine salt (A) (2-METHYL-5-OXO-CYCLOPENT-1-1-ENYL)PHENYL MALONATE A mixture of phenylmalonic acid (18 g.), 3-methyl-1,2-cyclopentanediol (11.2 g.), isopropyl ether (200 ml.), thionyl chloride (11.9 g.) and N,N-dimethylformamide (1 ml.) is refluxed for 1.5 hours. An amber oil separates from the solution. Sufficient ethyl acetate is then added to restore a one-phase system. The solution is washed with water (2× 50 ml.), then extracted with saturated aqueous sodium bicarbonate (3× 50 ml.). The basic aqueous extract is acidified to pH 3 with 6 N hydrochloric acid and the precipitate which forms extracted into ethyl acetate. The extract is dried over anhydrous sodium sulfate, decolorized with charcoal and evaporated to dryness. The mono-(2-methyl-5-oxo-cyclopent-1-enyl) ester is used directly in step B.

(B) ACID CHLORIDE OF (2-METHYL-5-OXO-CYCLOPENT-ENYL)PHENYL MALONATE

A mixture of the monoester (19.0 g.), thionyl chloride (8.2 g.) and methylene chloride (200 ml.) is refluxed for 2.5 hours on a steam-bath then evaporated to dryness. The residue is redissolved in methylene chloride (200 ml.) and the evaporation repeated to remove unreacted thionyl chloride.

(C) ACYLATION OF 6-AMINOPENICILLANIC ACID

A mixture of 6-aminopenicillanic acid (14.9 g.), triethylamine (13.94 g.) and methylene chloride (250 ml.) is stirred at room temperature for two hours, then filtered. The solution is cooled to 10° C. in an ice-bath and a solution of the mono acid chloride of step B in methylene chloride (200 ml.) added. The mixture is stirred for one-half hour after which the ice-bath is removed and stirring continued for one hour at room temperature. An equal volume of water is added. The pH adjusted to 3.0, the methylene chloride phase separated, dried over anhydrous sodium sulfate and evaporated to dryness. The residue is taken up in ethyl acetate and the solution extracted with saturated aqueous sodium bicarbonate (3× 100 ml.). An equal volume of ethyl acetate is added to the aqueous alkaline extract, the pH adjusted to 3.0 and the ethyl acetate layer separated. The aqueous layer is again extracted with ethyl acetate (2× 50 ml.) and the combined extracts dried over anhydrous sodium sulfate and evaporated to dryness.

The residue, an amber foam, is dissolved in acetone (180 ml.) and N-ethylpiperidine (4.3 g.) added. The crystalline salt precipitates upon scratching the glass container with a glass rod. The product is filtered off, washed with acetone and air-dried (4.42 g.). Additional material can be recovered from the mother liquor. M.P. 148°–151° C. (dec.).

EXAMPLE II

α-{Carbo-[1-(2-ethyl-5-oxo-cyclopent-1-enyloxy)]} benzylpenicillin N-ethylpiperidine salt To a stirred solution of phenyl chlorocarbonyl ketene (3.6 g.) under an atmosphere of nitrogen and cooled to −70° C. there is added a solution of 3-ethyl-1,2-cyclopentanediol (2.52 g.) in methylene chloride (50 ml.). The mixture is stirred for ten minutes at −70° C. then triethylamine (2.02 g.) in methylene chloride (10 ml.) added. After ten minutes, a previously prepared solution of 6-aminopenicillanic acid triethylamine salt [see Example I(C) made from 6-aminopenicillanic acid (4.32 g.), triethylamine (4.04 g.) and methylene chloride (100 ml.)] is added and the mixture stirred for ten more minutes. The cooling bath is removed and the mixture stirred for one-half hour.

It is evaporated to dryness, the residue dissolved in ethylacetate water (100 ml. of 1:1) and the pH adjusted to 2.5. The ethylacetate layer is separated and combined with an equal volume of fresh water. The pH of this mixture is brought to 7.0 with saturated aqueous sodium bicarbonate, the mixture thoroughly stirred and the aqueous layer collected.

An equal volume of ethyl acetate is added to the aqueous layer, the pH adjusted to 3.0 with 6 N hydrochloric acid and the ethyl acetate phase separated. It is dried over anhydrous sodium sulfate and evaporated to dryness. The residue, 4.2 g. of a yellow foam, is taken up in acetone (40 ml.) and treated with N-ethylpiperidine (0.975 g.). A crystalline solid separates and after 1.5 hours at room temperature, is recovered by filtration, washed with acetone, ether and air-dried; M.P. 136°–139° C. (dec.).

EXAMPLE III

Repetition of the procedure of Example II but using the appropriate 3-substituted-1,2-cyclopentanediol in place of 3-ethyl-1,2-cyclopentanediol produces the following penicillin esters as their N-ethylpiperidine salts.

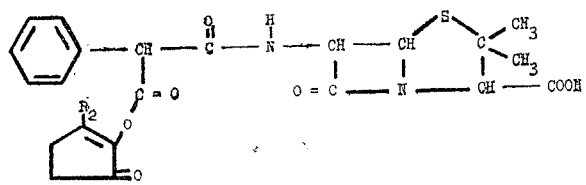

| R₂: | M.P. (° C). |
|---|---|
| n-Propyl | 134–137 (dec.) |
| n-Butyl | 124–127 (dec.) |
| Sec.-butyl | 131–134 (dec.) |
| Benzyl | 118–121 (dec.) |

EXAMPLE IV

Following the procedure of Example I, the following penicillin esters are prepared as their N-ethylpiperidine salts from the appropriate arylmalonic acid ester.

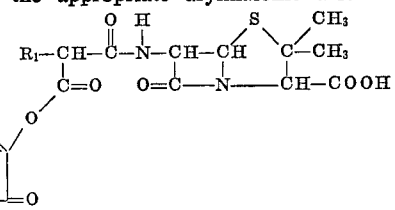

| R₁ | R₂ | R₁ | R₂ |
|---|---|---|---|
| 2-thienyl | Methyl. | 4-t-butylphenyl | n-Butyl. |
| Do | Ethyl. | Do | Benzyl. |
| Do | n-Propyl. | 2-methoxyphenyl | Methyl. |
| Do | i-Propyl. | 3-methoxyphenyl | Ethyl. |
| Do | n-Butyl. | Do | n-Butyl. |
| Do | Sec.-butyl. | 4-methoxyphenyl | Methyl. |
| Do | Benzyl. | Do | n-Butyl. |
| 3-thienyl | Methyl. | Do | Benzyl. |
| Do | Ethyl. | 2-ethoxyphenyl | Methyl. |
| Do | n-Propyl. | Do | Ethyl. |
| Do | n-Butyl. | Do | n-Propyl. |
| Do | Benzyl. | 2-isopropoxyphenyl | Methyl. |
| 2-furyl | Methyl. | Do | Sec.-butyl. |
| Do | n-Butyl. | Do | Benzyl. |
| Do | Benzyl. | 2-n-butoxyphenyl | Ethyl. |
| 3-furyl | Methyl. | Do | n-Propyl. |
| Do | n-Propyl. | Do | Benzyl. |
| Do | Benzyl. | 3-n-propoxyphenyl | Methyl. |
| 2-pyridyl | Ethyl. | Do | n-Butyl. |
| Do | Sec.-butyl. | Do | Benzyl. |
| Do | Benzyl. | 4-ethoxyphenyl | Methyl. |
| 3-pyridyl | Methyl. | 4-n-butoxyphenyl | Do. |
| Do | n-Butyl. | Do | Ethyl. |
| Do | Benzyl. | Do | n-Butyl. |
| 4-pyridyl | Ethyl. | Do | Benzyl. |
| Do | n-Butyl. | 2-dimethylamino-phenyl. | Methyl. |
| Do | Sec.-butyl. | Do | n-Butyl. |
| Do | Benzyl. | Do | Benzyl. |
| 2-methylphenyl | Methyl. | 2-di-n-propylamino-phenyl. | Methyl. |
| Do | Ethyl. | Do | Ethyl. |
| Do | n-Butyl. | 2-di-n-butylamino-phenyl. | Methyl. |
| 3-methylphenyl | Methyl. | Do | n-Propyl. |
| Do | i-Propyl. | Do | Benzyl. |
| Do | n-Butyl. | 3-dimethylamino-phenyl. | Methyl. |
| 4-methylphenyl | Methyl. | Do | Ethyl. |
| Do | Ethyl. | Do | n-Butyl. |
| Do | Sec.-butyl. | Do | Benzyl. |
| Do | Benzyl. | 3-diisopropylamino-phenyl. | Methyl. |
| 2-chlorophenyl | Methyl. | Do | Sec.-butyl. |
| 3-chlorophenyl | Do. | 4-dimethylamino-phenyl. | Methyl. |
| Do | Sec.-butyl. | Do | Ethyl. |
| Do | Benzyl. | Do | Sec.-butyl. |
| 4-chlorophenyl | Ethyl. | Do | Benzyl. |
| Do | n-Butyl. | 4-di-n-butylamino-phenyl. | Methyl. |
| Do | Benzyl. | Do | n-Propyl. |
| 2-bromophenyl | Methyl. | Do | Benzyl. |
| Do | n-Propyl. | 4-methylethyl-aminophenyl. | Ethyl. |
| 3-bromophenyl | Methyl. | Do | Benzyl. |
| Do | Ethyl. | 2-trifluoromethyl | Methyl. |
| Do | Benzyl. | Do | Ethyl. |
| 4-bromophenyl | Methyl. | Do | n-Butyl. |
| Do | b-Butyl. | 3-trifluoromethyl | Methyl. |
| Do | Benzyl. | Do | n-Propyl. |
| 2-ethylphenyl | Methyl. | Do | Benzyl. |
| Do | n-Propyl. | 4-trifluoromethyl | Ethyl. |
| 3-n-propylphenyl | Methyl. | Do | Sec.-butyl. |
| Do | Ethyl. | Do | n-Butyl. |
| Do | Benzyl. | | |
| 4-ethylphenyl | Methyl. | | |
| Do | Sec.-butyl. | | |
| 4-n-butylphenyl | Methyl. | | |
| Do | n-Propyl. | | |
| Do | n-Butyl. | | |
| Do | Benzyl. | | |
| 4-t-butylphenyl | Methyl. | | |
| Do | Ethyl. | | |

EXAMPLE V

The following penicillin esters are prepared by the procedure of Example II from the appropriate aryl carboxy ketene esters as their N-ethyl-piperidine salts.

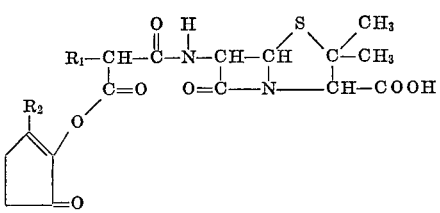

| R₁ | R₂ | R₁ | R₂ |
|---|---|---|---|
| Phenyl | Methyl. | 2-butoxy-phenyl | n-Butyl. |
| 2-methylphenyl | Do. | 2-diethylamino-phenyl. | Methyl. |
| Do | n-Propyl. | Do | n-Butyl. |
| Do | Benzyl. | 2-diethylamino-phenyl. | Benzyl. |
| 3-methylphenyl | Ethyl. | 2-chlorophenyl | Ethyl. |
| Do | Benzyl. | Do | n-Propyl. |
| 4-methylphenyl | n-Butyl. | Do | n-Butyl. |
| 2-ethylphenyl | Ethyl. | Do | Benzyl. |
| Do | Benzyl. | 4-chlorophenyl | Methyl. |
| 3-ethylphenyl | Methyl. | Do | Sec. butyl. |
| Do | n-Butyl. | 2-bromophenyl | Benzyl. |
| Do | Benzyl. | 4-bromophenyl | Ethyl. |
| 4-ethylphenyl | Do. | 2-thienyl | Methyl. |
| 2-n-propylphenyl | Benzyl. | Do | Benzyl. |
| Do | Methyl. | 3-thienyl | Do. |
| Do | n-Butyl. | 2-furyl | Ethyl. |
| 2-isopropylphenyl | Methyl. | Do | Sec. butyl. |
| Do | n-Propyl. | 3-furyl | Ethyl. |
| Do | Benzyl. | Do | Sec. butyl. |
| 2-n-butylphenyl | Ethyl. | 2-pyridyl | Methyl |
| 4-t-butyl | n-Propyl. | Do | n-Propyl. |
| 2-methoxyphenyl | Ethyl. | 3-pyridyl | Ethyl. |
| Do | Benzyl. | 4-pyridyl | Methyl. |
| Do | n-Butyl. | 2-trifluoromethyl | Benzyl. |
| 3-methoxyphenyl | Benzyl. | 3-trifluoromethyl | n-Butyl. |
| 4-methoxyphenyl | Ethyl. | 4-trifluoromethyl | Methyl. |
| 2-ethoxyphenyl | Sec. butyl. | Do | Benzyl. |
| Do | Benzyl. | | |
| 2-butoxyphenyl | Methyl. | | |

EXAMPLE VI

α-{Carbo-[1-(2-methyl-5-oxo-cyclopent-1-enyloxy)]} benzylpenicillin anhydride method A stirred solution of mono-(2-methyl-5-oxo-cyclopent-1-enyl)phenyl malonate (2.5 g.) in dry acetone (10 ml.) is cooled to 0° C. in an ice-bath. Anhydrous triethylamine (1.27 g.) is added dropwise over a 15-minute period, followed by dry chloroethylcarbonate (900 mg.). A precipitate of triethylamine hydrochloride forms immediately. A solution of 6-aminopenicillanic acid (1.8 g.) in sodium bicarbonate solution (20 ml. of 5 percent solution) and acetone (5 ml.) is added all at once to the mixed anhydride. The mixture is stirred at 0° C. for one-half hour, then extracted with ether (3 × 50 ml.) and acidified to pH 1.0 with concentrated hydrochloric acid. The acid solution is extracted with ethyl acetate (3 × 50 ml.), the extracts combined, back-washed with water, saturated salt solution and dried over anhydrous sodium sulfate. Removal of the solvent under reduced pressure gives the product as a yellow oil.

It is converted to the crystalline N-ethylpiperidine salt by dissolving in acetone (1 ml.) and adding a slight excess of N-ethylpiperidine. The salt is collected, washed with acetone and dried.

In like manner, the following penicillins are prepared from the appropriate reactants.

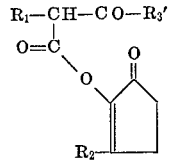

wherein R₃' represents the 6-aminopenicillanic acid moiety.

| R₁ | R₂ | R₁ | R₂ |
|---|---|---|---|
| Phenyl | n-Butyl. | 2-chlorophenyl | Benzyl. |
| Do | Benzyl. | 4-methylphenyl | Ethyl. |
| 3-thienyl | Methyl. | 4-dimethylamino- phenyl | Do. |
| Do | Ethyl. | | |
| Do | Benzyl. | 2-pyridyl | Benzyl. |
| 2-chlorophenyl | Methyl. | 2-furyl | Methyl. |

EXAMPLE VII

The N-ethylpiperidine salts of Examples I through IV are converted to the corresponding free acids and thence to other salts by the following general procedure.

The N-ethylpiperidine salt is dissolved in water-ethyl acetate (3–2) and adjusted to pH 2.5 with 6 N hydrochloric acid. The mixture is thoroughly shaken and the ethyl acetate phase separated, washed with water-made acid with dilute hydrochloric acid, then dried over anhydrous sodium sulfate. Evaporation of the solvent leaves the free acid form of the ester.

For conversion to the sodium or potassium salt, the free acid is taken up in water, the pH brought to 7.0 with a saturated aqueous solution of sodium bicarbonate (or potassium bicarbonate) and the solution stirred vigorously. The solution is filtered, if necessary, and extracted with ethyl actate (about one-half volume) then freeze dried.

The free acids are converted to their calcium, magnesium, ammonium, procaine, N,N'-dibenzylethylenediamine, N-ethylpiperidine, dibenzylamine, 1-ephenamine, triethylamine, N - benzyl-β-phenethylamine, N,N'-bis(dehydroabietyl) ethylenediamine and benzhydrylamine salts by reaction of aqueous solutions thereof with one equivalent of the appropriate base. The salts are recovered by freeze-drying.

EXAMPLE VIII

A solution of the sodium salt of α{carbo-[-(2-ethyl-5-oxo-cyclopent-1-enyloxy)]}benzylpenicillin in water (0.5 g. in 5 ml.) is held at room temperature for twenty-four hours. The pH is automatically regulated at 8.0 to 8.5 by the addition of sodium bicarbonate. The solution is then freeze-dried and the by-product phenol removed by trituration of the residue with ethanol to give the disodium salt.

Repetition of this procedure but at 35° C. for two hours also produces the disodium salt.

EXAMPLE IX

A tablet base is prepared by blending the following ingredients in the proportion by weight indicated.

| | |
|---|---|
| Sucrose, U.S.P. | 80.3 |
| Tapioca starch | 13.2 |
| Magnesium stearate | 6.5 |

Sufficient α{carbo - [1 - (2-n-butyl-5-oxo-cyclopent-1-enyloxy)]}benzylpenicillin triethylamine salt is blended into the base to provide tablets containing 25, 100 and 250 mg. of active ingredient.

EXAMPLE X

Capsules containing 25, 100 and 250 mg. of active ingredients are prepared by blending sufficient α-{carbo-[1 - (2-ethyl-5-oxo-cyclopent-1-enyloxy)]} benzylpenicillin sodium salt in the following mixture (proportions given in parts by weight).

| | |
|---|---|
| Calicum carbonate, U.S.P. | 17.6 |
| Dicalcium phosphate | 18.8 |
| Magnesium trisilicate | 5.2 |
| Lactose, U.S.P. | 5.2 |
| Potato starch | 5.2 |
| Magnesium stearate A | 0.8 |
| Magnesium stearate B | 0.35 |

EXAMPLE XI

A suspension of α-{carbo-[1-(2-methyl-5-oxo-cyclopent-1-enyloxy)]} benzylpenicillin potassium salt is prepared with the following composition:

Penicillin compound—31.42 g.
70% aqueous sorbitol—714.29 g.
Glycerine, U.S.P.—185.35 g.
Gum acacia (10% solution)—100 ml.
Polyvinyl pyrrolidone—0.5 g.
Propyl parahydroxybenzoate—0.172 g.
Distilled water to make one liter—0.094 g.

Various sweetening and flavoring agents may be added to this suspension, as well as acceptable colors. The suspension contains approximately 25 mg. of penicillin compound per milliliter.

EXAMPLE XII

The sodium salt of α-{carbo-[1(2-ethyl-5-oxo-cyclopent-1-enyloxy)]}benzylpenicillin (10 g.) is intimately mixed and ground with sodium citrate (4 percent by weight). The ground, dry mixture is filled into vials, sterilized with ethylene oxide and the vials sterilely stoppered. For parenteral administration, sufficient water is added to the vials to form solutions containing 25 mg. of active ingredient per ml.

PREPARATION A

Malonic acids

The following arylmalonic acids not previously described in the literature are prepared by the method of Wallingford et al., J. Am. Chem. Soc. 63, 2056–2059 (1964) which comprises condensing an alkyl carbonate, usually diethyl carbonate, with an equimolar proportion of the desired ethyl aryl acetate in the presence of an excess (4–8 times) of sodium ethylate with continuous removal of by-product alcohol from the reaction mixture. The esters thus produced are hydrolyzed to the acid by known methods.

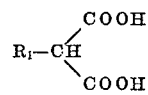

R₁:
- 2-methoxyphenyl
- 3-methoxyphenyl
- 4-methoxyphenyl
- 2-trifluoromethylphenyl [1]
- 3-trifluoromethylphenyl
- 4-trifluoromethylphenyl
- 4-di-n-butylaminophenyl
- 2-isopropylphenyl
- 4-t-butylphenyl
- 3-furyl
- 3-n-propylphenyl
- 3-pyridyl
- 4-pyridyl
- 2-n-butoxyphenyl
- 2-dimethylaminophenyl
- 2-diethylaminophenyl
- 3-dimethylaminophenyl
- 4-methylethylaminophenyl
- 4-dimethylaminophenyl
- 4-n-butoxyphenyl
- 4-ethoxyphenyl

PREPARATION B

Arylchlorocarbonyl ketenes (A) To a stirred solution of phosphorous pentachloride (46 g.) in ethyl ether (100 ml.) there is added phen-

---

[1] The necessary o-trifluoromethylphenylacetic acid is prepared from o-trifluoromethylbenzonitrile by the procedure of Corse et al., J. Am. Chem. Soc. 70, 2841 (1948) which comprises: (a) conversion of the nitrile to o-trifluoromethylacetophenone by a Grignard reaction with methylmagnesium iodide, followed by hydrolysis; and (b) reaction of the acetophenone with sulfur and morpholine at 135° C. for 16 hours, followed by treatment with glacial acetic acid and hydrochloric acid.

ylmalonic acid (10 g.) over a two-minute period. The mixture is stirred at room temperature for four hours, then refluxed for four hours and allowed to stand overnight at room temperature. The excess phosphorous pentachloride is filtered off and the ether boiled off at atmosphere pressure. The reaction mixture gradually progresses in color from dark yellow to red. The residue is distilled in vacuo to give the product B.P. 83°–86° C. at 1.5 mm. as a yellow liquid.

(B) The above procedure is repeated but using the appropriate malonic acid derivative in place of phenylmalonic acid to produce the following compounds:

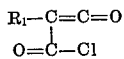

$R_1$:
  2-thienyl
  3-thienyl
  2-furyl
  o-Tolyl
  m-Tolyl
  u-Tolyl
  2-methoxyphenyl
  3-methoxyphenyl
  4-methoxyphenyl
  2-trifluoromethylphenyl
  4-trifluoromethylphenyl
  3-trifluoromethylphenyl
  2-isopropylphenyl
  4-t-butylphenyl
  3-n-propylphenyl
  4-di-n-butylaminophenyl
  3-furyl
  2-pyridyl
  3-pyridyl
  4-pyridyl
  2-bromophenyl
  2-chlorophenyl
  4-chlorophenyl
  3-chlorophenyl
  2-butoxyphenyl
  2-dimethylaminophenyl
  2-diethylaminophenyl
  3-dimethylaminophenyl
  4-dimethylaminophenyl
  4-methylethylaminophenyl
  4-n-butoxyphenyl
  4-ethoxyphenyl

PREPARATION C

Esters of arylcarboxy ketenes general preparation method

To a solution of the appropriate aryl halocarbonyl ketene (0.1 mole) in methylene chloride (sufficient to provide a clear solution and generally from about 5 to 10 ml. per gram of ketene) there is added the proper alcohol $R_3OH$ (0.1 mole). The reaction mixture is maintained under an atmosphere of nitrogen and stirred for a period of from 20 minutes to three hours, care being taken to exclude moisture. The temperature may range from about −70° C. to about −20° C.

The esters are used without further purification in the preparation of the α-carboxyarylmethylpenicillin esters described herein. The arylcarboxy ketene esters are converted to arylmalonic acid half-esters as follows:

Water (200 ml.) is then added to the reaction mixture of the arylcarboxy ketene ester followed by three equivalents of sodium bicarbonate. The mixture is warmed to 0° C. and stirred for a half-hour to form a heavy emulsion. The methylene chloride is removed under reduced pressure below 35° C. and the remaining aqueous solution extracted with ether. The ether extract is backwashed with water (made alkaline to pH 8 with sodium bicarbonate), dried with anhydrous sodium sulfate, and evaporated to give unreacted alcohol.

The basic aqueous solution is cooled to 10° C., adjusted to pH 2.0 with dilute hydrochloric acid then extracted with methylene chloride. The extract is dried with anhydrous sodium sulfate and evaporated to dryness to leave the malonic acid half-ester.

PREPARATION D

Acid chlorides of arylmalonic acid half-esters general preparation method

A solution of the malonic acid half-ester is methylene chloride (approximately 10 ml. per gram of ester) and thionyl chloride (1 equivalent) is gently refluxed for three hours. The methylene chloride solvent and other volatiles are then removed by evaporation under reduced pressure to leave the acid chloride product. The acid chlorides are used without further purification.

PREPARATION E 2-hydroxy-3-methylcyclopent-2-en-1-one (A) SODIUM 2-CARBOMETHOXYCYCLOPENTAN-1-ONE A 1-liter, 4-nicked round-bottom flask fitted with a mechanical stirrer, a thermometer, a nitrogen inlet tube and a Y-tube equipped with a dropping funnel and a Vigreaux column containing a condenser and adapter for vacuum distillation is purged with dry nitrogen and charged with 56.4 g. (1.06 moles) of sodium methoxide and 250 ml. of dry dimethyl formamide. Dimethyl adipate (174 g., 1.0 moles) is rapidly added with stirring from the dropping funnel. After addition is complete the nitrogen inlet is closed, the water aspirator turned one and the pressure adjusted to about 165 mm. with a needle valve regulator connected to the nitrogen source. The clear, light brown solution is stirred and heated and the methanol which is formed during the reaction is allowed to distill. The reaction is complete when the reaction mixture temperature reaches about 110–112° C. and the head temperature remains constant at about 105–108° C. (½ to 1 hour). The vacuum is released using the nitrogen inlet tube and the solution is allowed to cool to room temperature under a stream of dry nitrogen.

(B) 2-METHYL-2-CARBOMETHOXYCYCLOPENTAN-1-ONE

The slurry of sodium 2-carbomethoxycyclopentan-1-one in dimethyl formamide of step A is cooled to 0°–10° C., stirred, and 101 g. (2.0 moles) of methyl chloride then bubbled in rapidly. The reaction vessel is sealed and the temperature raised to 90°–95° C. After one hour, the mixture is cooled to room temperature, any residual pressure released, and the solvent removed by distillation of the mixture to 20 mm. with a bath temperature of 70°–75° C. Benzene (1 liter) is added to the residue and the mixture extracted with water (200 ml.). After drying over magnesium sulfate and filtering, the benzene is removed by vacuum (20 mm.) distillation at a bath temperature of 50°–60° C. leaving 160–170 g. of a light yellow oil as residue. Besides residual solvent, the crude product contains 5 to 15 percent of α-methyl dimethyladipate as the only impurity. It is sufficiently pure for chlorination in step C.

(C) 5,5-DICHLORO-2-METHYL-2-CARBOMETHOXY-CYCLOPENTAN-1-ONE

Crude 2 - methyl - 2 - carbomethoxycyclopentan-1-one (160–170 g.) is dissolved in 1 liter of glacial acetic acid and a small amount of chlorine gas added to the solution. After the green color has dissipated, chlorine is bubbled in rapidly with stirring while the temperature is held at 45°–50° C. with external cooling. After about 2.75 hours and after 125–130 g. (1.8 moles) have been added, chlorine consumption ceases. Removal of the acetic acid by vacuum (20 mm.) distillation at a bath temperature of 45°–50° C. provides crude 5,5-dichloro-2-methyl-2-carbomethoxycyclopentan-1-one as a yellow oil (215–220 g.). Besides residual solvent, 5 to 15 percent of α-methyl dimethyladipate is present as the only impurity. This material is sufficiently pure for hydrolysis in step D.

(D) 2-HYDROXY-3-METHYLCYCLOPENT-2-EN-1-ONE

A mixture of crude 5,5-dichloro-2-methyl-2-carbomethoxycyclopentan-1-one (215–220 g.) and 2 liters of 10 percent sulfuric acid is heated under reflux with vigorous stirring for twenty-four hours. The resulting brown solution is cooled to room temperature, filtered from a small amount of black oil, saturated with sodium sulfate, and extracted with three 200 ml. portions of ethyl acetate. The combined extracts are washed with saturated sodium bicarbonate solution, dried over magnesium sulfate, and evaporated to dryness to afford 90–100 g. (85 to 88 percent from dimethyladipate) of 2-hydroxy-3-methylcyclopent-2-en-1-one of M.P. 98°–102° C. The material is recrystallized from hexane or ethyl acetate (90 percent recovery) to give material of M.P. 103°–104° C.

Repetition of the above procedure but using the appropriate lower alkyl bromide or benzyl chloride in place of methyl chloride produces the following 2-hydroxy-3-substituted-cyclopent-2-en-1-ones:

2-hydroxy-3-ethyl-cyclopent-2-en-1-one
2-hydroxy-3-n-propylcyclopent-2-en-1-one
2-hydroxy-3-isopropylcyclopent-2-en-1-one
2-hydroxy-3-n-butylcyclopent-2-en-1-one
2-hydroxy-3-sec-butylcyclopent-2-en-1-one
2-hydroxy-3-benzylcyclopent-2-en-1-one

What is claimed is:
1. A compound of the formula

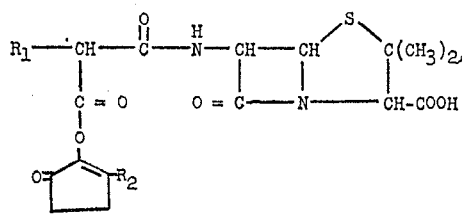

and the pharmaceutically-acceptable salts thereof wherein $R_1$ is phenyl and $R_2$ is selected from the group consisting of lower alkyl and benzyl.

2. The compounds of claim 1 wherein $R_2$ is lower alkyl and the pharmaceutically-acceptable salts thereof.
3. The compound of claim 1 wherein $R_2$ is n-propyl.
4. The compound of claim 1 wherein $R_2$ is benzyl.
5. The compound of claim 1 wherein $R_2$ is ethyl.
6. The compound of claim 1 wherein $R_2$ is n-butyl.
7. The compound of claim 1 wherein $R_1$ is 2-methylphenyl and $R_2$ is methyl.
8. The compound of claim 4 wherein $R_2$ is sec-butyl.

References Cited
UNITED STATES PATENTS

| | | | |
|---|---|---|---|
| 3,502,656 | 3/1970 | Neal et al. | 260—239.1 |
| 3,372,158 | 3/1968 | Matt | 260—239.1 |

NICHOLAS S. RIZZO, Primary Examiner

U.S. Cl. X.R.

424—271